United States Patent [19]

Cameron

[11] Patent Number: 4,817,463
[45] Date of Patent: Apr. 4, 1989

[54] ELECTRIC CABLE TENSIONING DEVICE

[75] Inventor: Gregory W. Cameron, Jackson, Mich.

[73] Assignee: ITT Corporation, New York, N.Y.

[21] Appl. No.: 38,215

[22] Filed: Apr. 14, 1987

[51] Int. Cl.⁴ .......................... F16H 3/44; F16H 57/10
[52] U.S. Cl. ................................. 74/781 R; 74/750 R;
188/2 D
[58] Field of Search .............. 74/781 R, 750 R, 411.5,
74/501.5 R, 89, 89.16, 52; 188/2 D, 161; 192/4 A

[56] References Cited

U.S. PATENT DOCUMENTS

| | | | |
|---|---|---|---|
| 1,771,468 | 7/1930 | Schmitz | 74/781 R |
| 2,910,892 | 11/1959 | Hodge | 74/781 R |
| 4,360,089 | 11/1982 | Matsui et al. | 74/781 R |
| 4,526,060 | 7/1985 | Watanabe | 74/781 R |

FOREIGN PATENT DOCUMENTS 147174  5/1902  Fed. Rep. of Germany .... 74/750 R

Primary Examiner—Leslie A. Braun
Assistant Examiner—David Novais
Attorney, Agent, or Firm—James B. Raden

[57] ABSTRACT

An electric brake cable tensioning device is disclosed including a planetary gear train driven by a motor driven worm gear and a friction brake for holding a sun gear of the gear train against rotation during torque input. The cable is attached to a planet gear of the gear train which moves around the braked sun gear and pulls the cable in tension. The worm gear and braked sun gear hold the planet gear and cable in the tensioned position. Cable tension is released upon release of the sun gear whereupon the planet gear moves back to the untensioned position.

10 Claims, 1 Drawing Sheet

ELECTRIC CABLE TENSIONING DEVICE

BACKGROUND OF THE INVENTION

This invention relates to a cable tensioning device. More particularly, the invention relates to an electric parking brake cable tensioning device for an automobile.

Heretofore, electrically activated parking brakes have included various gearing systems for advancing and retracting lever arms, pedals and cables. These gearing systems are operated by reversible electric motors through complex electrical switching circuits. The complexity of such systems and in particular with regard to their electrical switching circuits has been due to the requirement of reversing the direction of rotation of the motor to release tension on the cable. Also, electric actuator systems presently available for tensioning a parking brake cable are typically subject to backdriving of the electric motor when the cable is tensioned which imposes large loads on the motor and significantly reduces its useful life. Gearing and switching systems required to avoid such backloading have been bulky, complex and not cost effective.

SUMMARY OF THE INVENTION

It is therefore an object of the present invention to provide for an electric parking brake cable tensioning device which will tension and hold a brake cable in tension without backloading of the electric motor driving the system and without the need for complex gearing and switching systems.

According to the invention, there is provided a planetary gear set driven by a motor-driven worm gear. Advantageously, the worm gear can only be driven in the direction of its input torque as supplied by the electric motor and accordingly cannot be backloaded through the planetary gear set.

According to an important feature of the invention, a planet gear of the gear set has the cable to be tensioned pivotably attached to its rotational center.

Another feature of the invention provides for a sun gear to be held against rotation by a frictional brake during torque input from the electric motor causing the planet gear to move around the rotational center of the stationary sun gear pulling the cable in tension.

A still further important feature of the invention provides for a solenoid operated mechanism to release the frictional brake in the tensioned position allowing the sun gear to rotate providing for return of the planet gear and cable to the untensioned position.

The frictionally braked sun gear in the tensioned position and a ring and worm gear input provide for no backloading of the motor.

Advantageously, the invention provides for an infinite number of cable tension positions with the maximum cable tension limited as determined by a motor stall condition.

BRIEF DESCRIPTION OF THE DRAWINGS

The invention will be better understood after a reading of the following Detailed Description Of The Preferred Embodiment in conjunction with the drawing in which.

DETAILED DESCRIPTION OF THE PREFERRED EMBODIMENT

Figure 2:
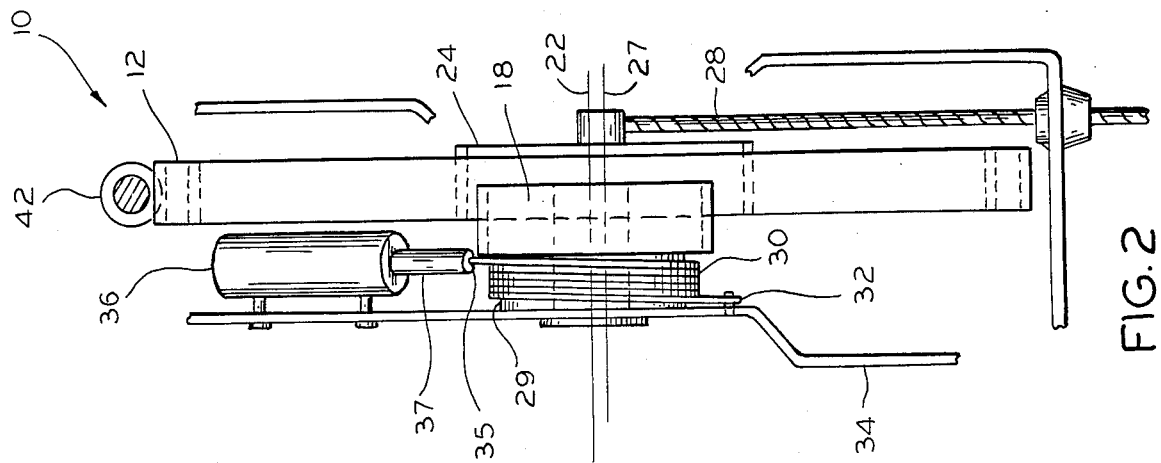
FIG. 2 is an end view of the cable tensioning device of FIG. 1 showing further details of construction.

Shown in the drawings is an electric cable tensioning device 10 including a planetary gear train having a ring gear 12 provided with one set of gear teeth 14 on its external periphery and another set of gear teeth 16 on its inner periphery. The planetary gear train further includes a sun gear 18 having gear teeth 20. The sun gear 18 is mounted co-axial with the ring gear 12 and both are rotatable about a common axis 22. Positioned between the ring gear 12 and the sun gear 18 is a planet gear 24 carrying teeth 26 meshed with the sun gear teeth 20 and the ring gear inner teeth 16. As described below, when the sun gear 18 is released, the planet gear 24 is free to rotate about the second axis 27. The cable 28 to be tensioned is pivotably attached to the planet gear 24 at its rotational axis 27. The cable 28 extends to the device to be operated such as a parking brake of a vehicle.

As shown best in FIG. 2, the sun gear 18 is provided with a frictional surface 29 either integrally formed with the gear or as, for example, a separate frictional barrel press fitted into the inner circumference of the sun gear. A coil spring 30 surrounds the friction barrel and has an inside diameter less then the diameter of the barrel and is normally tensioned against the friction surface 29. One end 32 of the spring 30 is fixed to a plate 34 and the other end 35 is maintained normally free to move. Such arrangement provides for normally frictionally braking and holding the sun gear 18 against rotation. An electric solenoid 36 is mounted to the plate 34 and in the released position is normally deactivated so that the spring remains engaged to the friction surface and the sun gear is braked against rotation.

Figure 1:
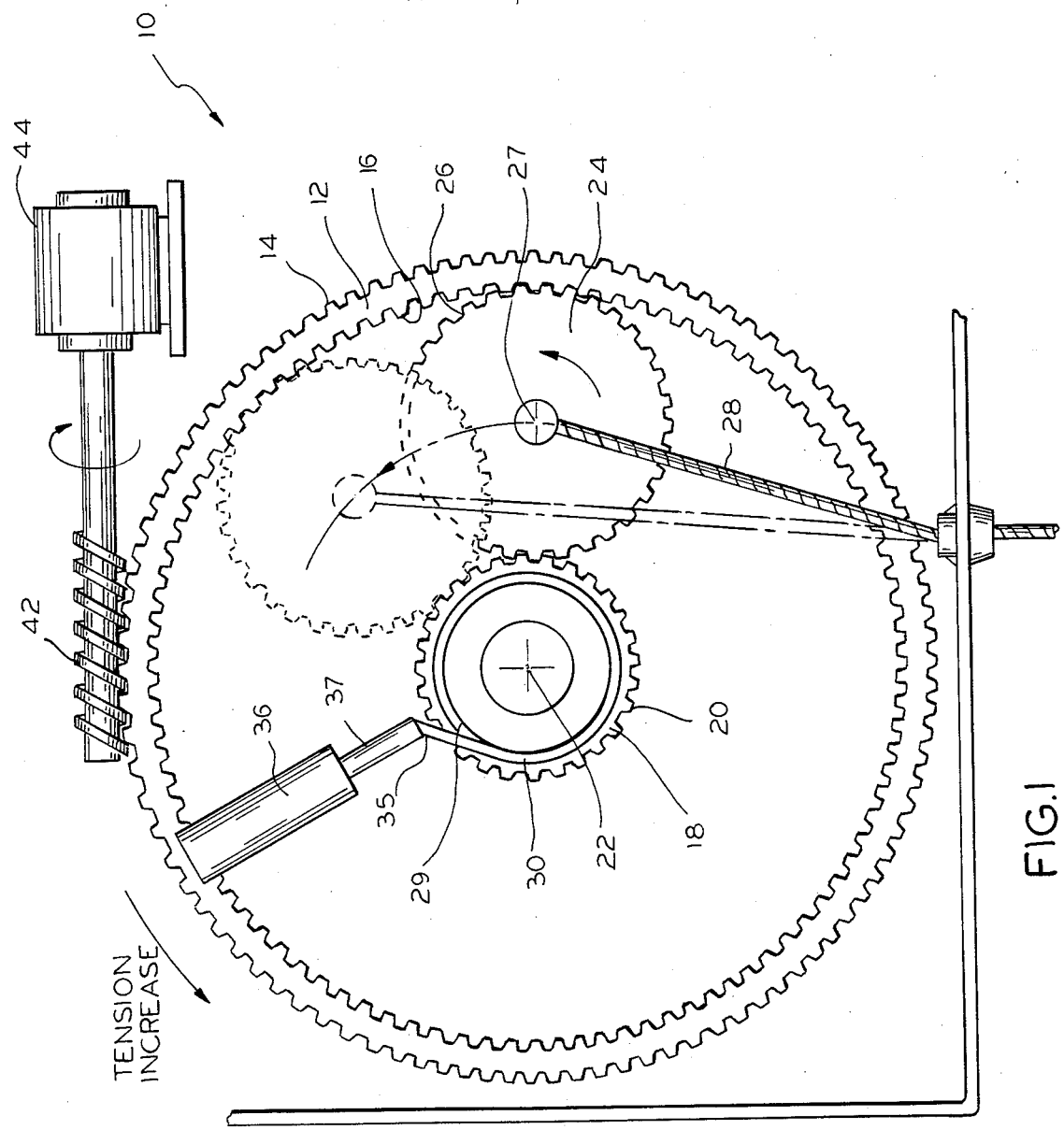
FIG. 1 is a frontal view of the cable tensioning device according to the invention showing details of construction and operation.

As shown in FIG. 1, an input worm gear 42 is meshed with the external teeth 14 of the ring gear and, in the embodiment shown, imparts a counter-clockwise input moment, to the ring gear 12 to tension the cable. The worm gear 42 receives an input torque from an operator controlled motor 44.

Operation of the device will now be described with reference to FIG. 1. The device is shown in FIG. 1 with the release of cable untensioned position of the planetary gear set in solid lines and the applied or cable tensioned position is shown in outline form. Beginning the untensioned position, when the motor 44 is activated, the worm gear 42 is driven with a clockwise, as shown by the arrow in FIG. 1, torque which in turn imparts a counter-clockwise moment to the ring gear, also shown by an arrow in FIG. 1. The solenoid 36 is deactivated and the coil spring 30 frictionally holds the sun gear 18 so that it remains stationary. Because the sun gear is stationary, the planet gear 24 simultaneously rotates in a counter-clockwise direction about its axis 27 and moves in a counter-clockwise circular path about the axis 22 of the sun and ring gears thereby pulling and increasing the tension in the cable 28.

At the tensioned position, shown in outline, the drive motor 44 is deactivated. Two important features of the invention provide for retention of the cable in the tensioned position without imposing a backload through the gear train on the motor. First, a worm gear can be driven only by its input source, in this case by the motor 44 and consequently, any tendency of the ring gear 12 to rotate clockwise, as viewed in the drawing, back to the untensioned position is not passed through the worm gear and the motor is relieved of substantially all backload. Secondly, because the ring gear 12 cannot rotate the worm gear 42, and because the sun gear 18 is held stationary, the planet gear 24 and cable 28 are held in the tensioned position. If desired, the torque developed by the motor can be monitored and the motor automatically deactivated at a preset torque level representing a desired cable tension. Such operation provides for precise repetition of reset of cable tension and prevents over or under-tensioning of the cable.

To release the cable tension, the solenoid 36 is activated and the plunger 37 of the solenoid causes the free end 35 of the spring 30 to move in a direction for unwinding the spring and releasing its hold from the friction surface of the sun gear. In the embodiment shown, the spring end 35 is affixed to the plunger 37 which retracts upon activation and uncoils the spring. It is to be understood that other arrangements are possible, for example, the plunger could extend when the solenoid is activated and pushes on the spring end 35. Any arrangement for selectively engaging and releasing the friction hold on the sun gear can be utilized. The sun gear and planet gear are thereby free to rotate, the cable tension pulls on the planet gear 24 causing the sun and planet gears to rotate and the planet gear moves clockwise about the axis 22 back to the untensioned position.

Having described the preferred embodiment of the invention and its operation, those skilled in the art can readily device other embodiments and modifications and those other embodiments and modifications are to be considered to be within the scope of the impending claims.

What is claimed is:

1. A cable tensioning device, comprising:
   planetary gear means applying tensile force to a cable affixed to said planetary gear means, said planetary gear means being rotatable between a cable untensioned position and a cable tensioned position, said planetary gear means being rotatable toward said cable tensioned position in response to an input moment to said planetary gear means;
   means for imparting said input moment to said planetary gear means, said means for imparting said input moment being responsive to an input torque from a single input torque source, and
   means for holding said planetary gear means at said cable tensioned position upon cessation of said input moment, said means for holding being adaptable for releasing said planetary gear means for movement to said untensioned position.

2. The cable tensioning device according to claim 1, wherein said means for imparting said input moment includes a worm gear adapted to be coupled to said input torque source, said worm gear meshed with a ring gear of said planetary gear means.

3. The cable tensioning device according to claim 1, wherein said means for holding said planetary gear means at said cable tensioned position includes a friction brake releasably engaging a sun gear of said planetary gear means at least in the cable tensioned position.

4. The cable tensioning device according to claim 3, wherein said friction brake is engagable to hold said sun gear against rotation during application of said input moment.

5. The cable tensioning device according to claim 4, wherein said friction brake is a coil spring surrounding a friction surface on said sun gear, said coil spring being frictionally engaged to said friction surface to hold said sun gear against rotation.

6. The cable tensioning device according to claim 5, further including solenoid operated release means associated with said coil spring, said solenoid operated release means adapted to uncoil said spring when activated to release said coil spring from engagement with said friction surface.

7. The cable tensioning device according to claim 6, wherein said means for imparting said input moment to said planetary gear means is a worm gear engaged to a ring gear, said worm gear adapted to receive said input torque from a motor.

8. The cable tensioning device according to claim 7, further including a planet gear meshed with said ring gear and with said sun gear, said sun gear and said ring gear being rotatable about a first common rotational axis, said planet gear being rotatable about a second rotational axis and movable over a circular path around said first rotational axis between said cable tensioned position and said cable untensioned position, said planet gear adapted to have said cable to be tensioned pivotably attached thereto at said second rotational axis.

9. A cable tensioning device, comprising:
   planetary gear means having a cable to be tensioned attached thereto for movement with a planet gear of said planetary gear means, said planet gear being movable in a first direction in response to an input moment to said planetary gear means for tensioning said cable and in a second opposite direction for releasing said tension;
   means rotatable solely in response to an input torque from an input torque source for imparting said input moment to said planetary gear means, and
   means associated with said planetary gear means for selectively releasable holding said planet gear against movement upon cessation of said input torque, whereby said cable is held in tension, said planet gear being movable in said second direction upon release of said means for releasable holding, whereby said cable is untensioned.

10. A cable tensioning device, comprising:
    a planetary gear set including a ring gear rotatable about a first axis, a sun gear rotatable about said first axis and a planet gear meshed with said ring gear and said sun gear, said planet gear being rotatable about a second axis lying parallel to said first axis, said planet gear being mounted to said cable to be tensioned thereto at said second axis;
    a worm gear meshed with said ring gear, said worm gear adapted to be coupled to an input torque source; and
    releasable brake means associated with said sun gear for holding said sun gear against rotation upon application of said input torque to said worm gear, said brake means being selectively releasable from holding said sun gear.

* * * * *